(12) United States Patent
Brandenburg

(10) Patent No.: US 7,998,580 B2
(45) Date of Patent: Aug. 16, 2011

(54) WOOD PARTICLE MIXTURE FOR A WOOD-PLASTIC COMPOSITE MATERIAL AND METHOD FOR PRODUCING THE WOOD PARTICLE MIXTURE

(75) Inventor: Kay Brandenburg, Vechta (DE)

(73) Assignee: Brandenburg Holzfasertoffe GmbH & Co. (DE)

( * ) Notice: Subject to any disclaimer, the term of this patent is extended or adjusted under 35 U.S.C. 154(b) by 980 days.

(21) Appl. No.: 11/696,818

(22) Filed: Apr. 5, 2007

(65) Prior Publication Data
US 2007/0218219 A1    Sep. 20, 2007

(51) Int. Cl.
*B32B 5/66* (2006.01)
(52) U.S. Cl. ............... 428/402; 428/535; 428/537.1; 144/162.1; 144/373
(58) Field of Classification Search ............ 428/402, 428/535, 537.1; 144/162.1, 373
See application file for complete search history.

(56) References Cited

U.S. PATENT DOCUMENTS

| 2,766,686 A | | 1/1957 | Clark | |
|---|---|---|---|---|
| 2,776,686 A | * | 1/1957 | Clark | ............................ 144/373 |
| 4,301,846 A | * | 11/1981 | Berggren | ................... 144/162.1 |

FOREIGN PATENT DOCUMENTS

| CH | 540 756 | 10/1973 |
|---|---|---|
| DE | 2 233 374 | 1/1974 |
| DE | 35022101 C1 | 1/1986 |
| DE | 19702843 C1 | 8/1989 |
| DE | 1 217 588 | 5/1996 |
| DE | 195 04 030 | 7/1996 |
| DE | 1223 529 | 8/1996 |
| EP | 1004 413 A1 | 5/2000 |
| FR | 1020 295 | 2/1953 |
| WO | WO 96/34045 | 10/1996 |

\* cited by examiner

*Primary Examiner* — Leszek Kiliman
(74) *Attorney, Agent, or Firm* — Smith, Gambrell & Russell

(57) ABSTRACT

A wood particle mixture is described especially made from raw wood for an extruded or injection-molded wood-plastic composite material, especially manufactured from wood-plastic compound, which significantly improve the strength properties in a wood plastic composite material. Each wood particle has certain dimensions and certain shaping.

30 Claims, 4 Drawing Sheets

WOOD PARTICLE MIXTURE FOR A WOOD-PLASTIC COMPOSITE MATERIAL AND METHOD FOR PRODUCING THE WOOD PARTICLE MIXTURE

INTRODUCTION AND BACKGROUND

The present invention relates to a wood particle mixture and also to a method for producing a wood particle mixture, especially from raw wood, for an extruded or injection-molded wood-plastic composite material, especially wood-plastic compound. In addition, the invention relates to a device for performing the method according to the invention.

It is known to include such wood particle mixtures in various plastics, especially in polypropylene, wherein each individual wood particle is encased by plastic. Such wood-plastic composite materials are known from WO 96/34045. Because their strength properties are largely dependent on the homogeneity of the compound, the individual wood particles of the wood particle mixture lie in a range of sizes featuring pre-defined limits. However, the shape of the individual particles and their alignment within the wood-plastic composite material also have a strong influence on the strength properties.

SUMMARY OF THE INVENTION

A wood particle mixture, a method, and a device of the class described in the introduction, which significantly improve the strength properties in a wood-plastic composite material are described herein.

According to the invention, there is described a wood particle mixture, especially made from raw wood for an extruded or injection-molded wood-plastic composite material, especially manufactured from wood-plastic compound, characterized in that each wood particle has two cut surfaces which define its thickness and which run approximately in the direction of its grain, and each wood particle has cut edges and/or fracture edges defining its length in the direction of the grain and also its width perpendicular to the direction of the grain. In a further aspect of the invention, there is described a method for producing a wood particle mixture, especially made from raw wood, for an extruded or injection-molded wood-plastic composite material, e.g., manufactured from wood-plastic compounds, especially for producing the herein described wood particle mixture, characterized in that flat flakes are generated from the raw wood by means of at least one blade, the flat flakes are cut up, the cut-up flat flakes are broken up into flat splinters, and the flat splinters are filtered.

The wood particle mixture is distinguished in that each of its wood particles has two cut surfaces that define its thickness and run approximately in the direction of its grain, and in that each wood particle has cut and/or fracture edges that define its length in the grain direction and define its width perpendicular to the grain direction. Wood particles shaped in this way thus feature fewer, but elongated, fibers relative to its body volume. The use of such wood particle mixtures in a wood-plastic composite material has the advantage that the connections between the individual wood particles and the plastic run essentially along the grain, so that the individual fibers effectively increase the tensile strength and flexural strength of the wood-plastic composite material.

According to one refinement of the invention, at least 90 wt % of the wood particles have a thickness between 0.2 mm and 2.0 mm, preferably a thickness between 0.4 mm and 0.5 mm, and a length and width up to 8.0 mm. These details on size ranges are to be understood as preferred ranges, with which sufficient homogeneity in the wood composite material can be achieved. However, especially preferred is that at least 90 wt % of the wood particles have a thickness between 0.2 mm and 1.4 mm and a length and width up to 2.5 mm.

According to a next refinement of the invention, the cut surfaces running in the grain direction are arranged approximately parallel to each other. Thus, the individual wood particles each receive the shape of a flattened fiber strand section, which further improves the strength properties of the wood-plastic composite material.

It is proposed that each wood particle consist of spruce wood. Spruce wood satisfies the requirements for the wood composite material and is available in sufficient quantities particularly economically in Europe. It is further proposed that each wood particle consist of loblolly pine wood, which is available in the USA in sufficient quantities at economical prices. However, it is also conceivable to use other types of wood, e.g., if these can be obtained especially economically in one region or part of the world or if these exhibit a special suitability in the particular use for wood-plastic composite materials. Mixtures of different woods can also be used. Any suitable polymer, including thermoplastics and thermosetting resins can be used to make the extruded or injection molded articles.

It is further proposed that the wood particle mixture have a moisture content of less than 15% relative to the absolute dry mass. The low moisture content is primarily important to guarantee uniform operating conditions for the extrusion of wood plastic compounds. The extrusion process generates high temperatures, which lead to controlled evaporation of the moisture bound in the wood particle mixture. The same also applies for injection molded parts. Furthermore, with a moisture content of less than 15%, fungal attack is for the most part prevented, so that the final product made from the wood-plastic composite material is fit for storage.

According to another refinement of the invention, the wood particle mixture has an extract content of less than 5.5% relative to the absolute dry mass. This specification is based on measurements according to the ethanol-cyclohexane method or the hot-water method. A low extract content, especially a low resin content, is primarily important, so that the top surfaces of the extrusion molds do not stick and to be able to guarantee on the extrusion molds constant friction resistance that is not too high.

According to the method of the invention it is proposed that flakes be generated from the raw wood by means of at least one blade, that the flakes be cut up, that the cut-up flakes be broken up into flat splinters, and that the flat splinters be sifted. An especially large-volume flake pocket is advantageously allocated to each blade, so that the flakes feature an especially low curvature.

According to a refinement of the invention, the flakes are generated by blades arranged parallel to the grain of the raw wood. This has the advantage that the flakes in the flake pocket are bent only around a line running in the direction of the grain. The individual fibers are thus not bent.

In the following, the individual method steps are described in more detail:

The flakes generated from the raw wood are led into a wet bunker, which represents intermediate storage for continuous removal of the flakes. A stirring machine integrated in the wet bunker prevents sticking or bridging of the flakes. Then the flakes are supplied from the wet bunker via a vibrating flat channel at least to a cutting mill with a filter passage. The cutting mill advantageously features a cutting roll with V-shaped blades and also a counter blade corresponding to the blades. By means of air, the cut-up flakes are suctioned from the cutting mill through the filter passage, led into a wet cyclone, and there separated from the air stream. Then the cut-up flakes are led from the wet cyclone into a dosing bunker. From the dosing bunker, the cut-up flakes are led by means of air into a dryer. The dosing bunker is used as intermediate storage for the dryer. This has a pressure generator and a cyclone, wherein the flakes are led through the dryer with the air stream generated by the pressure generator and are separated again from the air stream in the cyclone. The cut-up and dried flakes are then led from the dryer into a dryer bunker, which is used in turn as intermediate storage, and from which the cut-up and dried flakes are supplied via a worm to a hammer mill, which also features a filter passage. Here, the cut-up and dried flakes are broken up into flat splinters with beating tools and suctioned through the filter passage from the hammer mill. Then the flat splinters are led into a drying cyclone, where they are again separated from the air stream. From the drying cyclone, the flakes are then led into a filtering device, in which the flat splinters lying within a certain range of sizes for the wood particle mixture are filtered out and flat splinters lying above the predetermined range of sizes are fed back into the drying bunker. The returned flat splinters are thus reduced in size again in the hammer mill.

In the filtering device, the flat splinters are sorted according to the size of their cut surfaces defining their thickness. The filtering device advantageously has a damping plate, on which the flat splinters are laid flat. By means of vibrating motion, the flat splinters then slide over the inclined damping plate onto the first flat sieve under which further flat sieves are arranged for filtering out predetermined ranges of sizes of the flat splinters.

According to an especially advantageous refinement of the invention, it is preferred that the flat splinters filtered from the filtering device and lying within a predetermined range of sizes be led to a wobble sieve, which separates out flat splinters lying below the predetermined range of sizes for the wood particle mixture. In this way, additional fine material, which could not be separated by the filtering device, is subsequently separated in an especially efficient way.

According to another refinement of the invention, the flakes are cut up in undefined directions. This is realized especially in that the flakes are supplied via the vibrating flat channel in an undefined alignment to the V-shaped blades of the cutting mill.

According to an especially advantageous refinement of the invention, extracts, especially resins, are washed out from the raw wood and/or the flakes and/or the cut-up flakes and/or the flat splinters and/or the wood particle mixture. This is realized, e.g., with the ethanol-cyclohexane method or the hot-water method.

The device according to the invention is used for performing the method according to the invention and is distinguished in that the filtering device has at least two flat sieves arranged one after the other with different mesh widths. The flat sieves are used to filter out the flat splinters lying in a predetermined range of sizes for the wood particle mixture. To be able to realize the size ratios of the individual wood particles mentioned for the wood particle mixture according to the invention, the first flat sieve has an open mesh width between 2 mm and 4 mm. In contrast, the second flat sieve has an open mesh width between 0.5 mm and 1.0 mm. The meshes of the flat sieves are shaped like squares.

In addition, it is provided that the cutting mill have at least one filter passage on the output side, which is formed as an elongated filter, whose elongated holes have a length between 40 mm and 70 mm and a width between 3 mm and 8 mm.

The hammer mill has at least two different alternating filter passages on the output side, which are formed as elongated filters, wherein the difference between the filter passages consists essentially in that the elongated holes of one of the filter passages has approximately twice the width of the elongated holes of the other filter passage. Such a configuration advantageously prevents the flat splinters from clogging or stopping up the filter passages. The elongated holes of the filter passages arranged in the hammer mill have a length between 10 mm and 50 mm and a width between 0.5 mm and 2.5 mm.

According to a refinement of the invention, the elongated holes of the filter passages arranged in the hammer mill and also the filter passages arranged in the cutting mill have a rotational spacing or a bridge width between 0.5 mm and 5.0 mm to each other.

The blade for generating the flakes has a length between 15 mm and 25 mm. The blades are advantageously assembled from a plurality of cutting teeth, which are in turn distributed over the circumference of a cutting roll. In addition, it is proposed that the blade be set in the device such that the ratio of the cutting speed divided by the advancing speed is between 550 and 750, preferably 650. A cutting speed of 39 m/s thus produces a preferred advancing speed of approximately 0.06 m/s.

BRIEF DESCRIPTION OF THE DRAWINGS

The invention will be further understood with reference to the accompanying drawings, wherein.

DETAILED DESCRIPTION OF INVENTION

Figure 1:
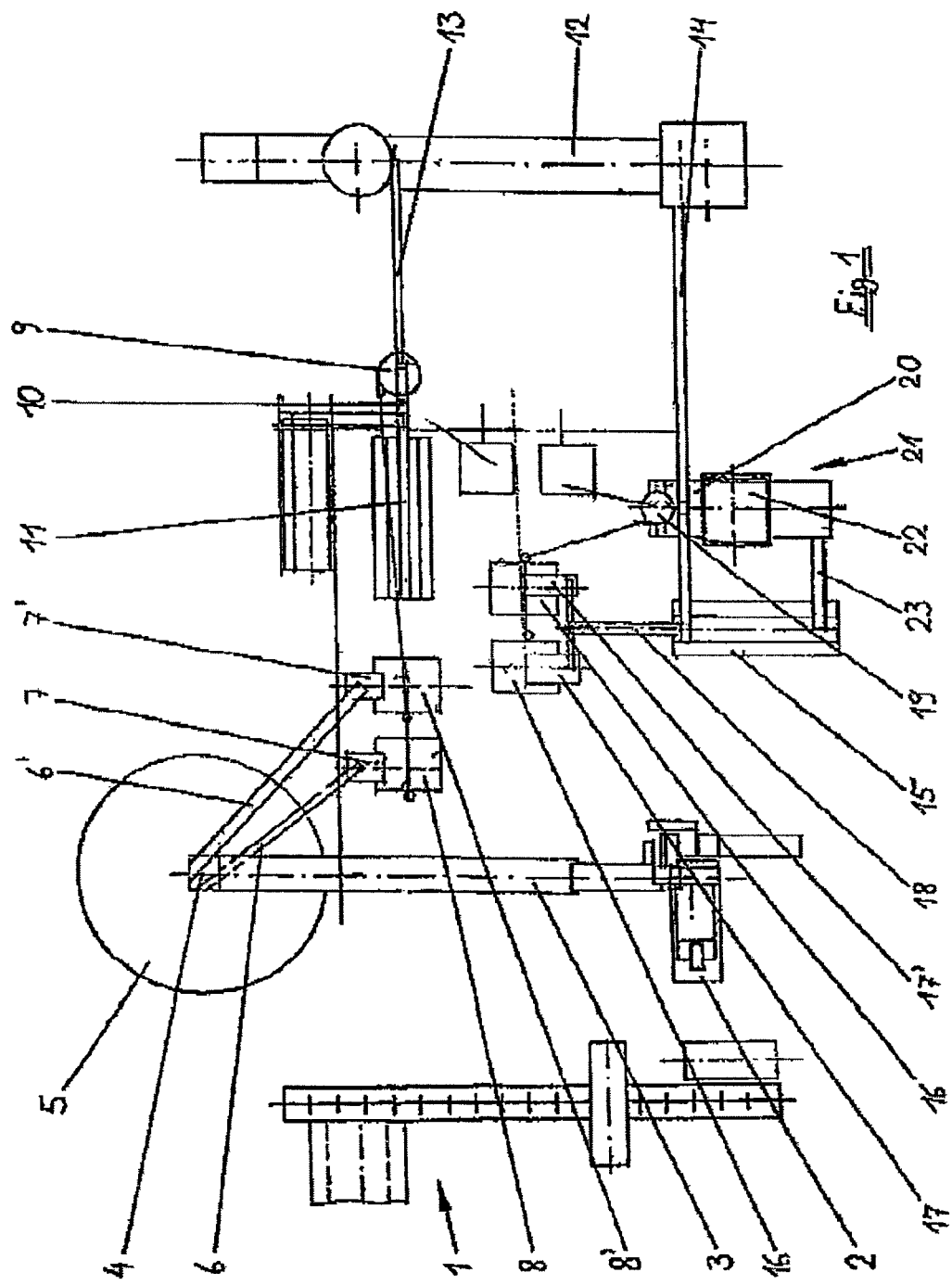
FIG. 1 shows a plan view of a layout for a device for performing the method according to the invention.

FIG. 1 shows a plan view of a layout for a device, for which the method according to the invention for producing a wood particle mixture is to be described in the following:

Tree trunks are stripped by a bark peeling device 1. The debarked tree trunks are then fed to a cutter shaft chipper 2 or to a cutter ring chipper, in which the stripped tree trunks are machined into flakes. From the cutter shaft chipper 2, the flakes are transported via a worm 3 and an elevator 4 into a wet bunker 5. The wet bunker 5 is configured as intermediate storage for continuous removal of the flakes. From here, the flakes are transported by means of two worms 6, 6' and two vibrating flat channels 7, 7' into two cutting mills 8, 8', in which the flakes are cut up. By means of air, the cut-up flakes are then suctioned from the cutting mills 8, 8' and led into a wet cyclone 9, which separates the cut-up flakes from the air. From the wet cyclone 9, the cut-up flakes are led with a pressure chain conveyor 10 into a dosing bunker 11. The dosing bunker 11 is formed as intermediate storage for a dryer 12 and is connected to the dryer 12 by means of a pressure chain conveyor 13. In this dryer, the cut-up flakes are dried, which is why the previously described system components are referred to with the term "wet side" and the system components described in the following are referred to with the term "dry side."

The cut-up flakes are suctioned through the dryer 12 and led on the output side into a dryer bunker 15 via a pressure chain conveyor 14. The dryer bunker 15 is formed as intermediate storage for two hammer mills 16, 16', which are each connected via a vibrating flat channel 17, 17' and a common worm 18 to the dryer bunker 15. In the hammer mills 16, 16', the cut-up and dried flakes are broken up into flat splinters. The flat splinters are suctioned by means of air from the hammer mills 16, 16' and led into a drying cyclone 19. In this cyclone the flat splinters are separated from the air stream. From the drying cyclone 19, the flat splinters are led by means of an inclined damping plate 20 into a filtering device 21. In the filtering device, the flat splinters lying in a predetermined range of sizes for the wood particle mixture according to the invention are filtered out by means of flat sieves 22 arranged one above the other. Flat splinters lying above the predetermined range of sizes are fed back from the filtering device 21 via a pressure chain conveyor 23 into the dryer bunker 15. The flat splinters lying in the predetermined range of sizes are led from the filtering device 21 via an elevator (not shown) into a finished goods silo (not shown).

Figure 2:
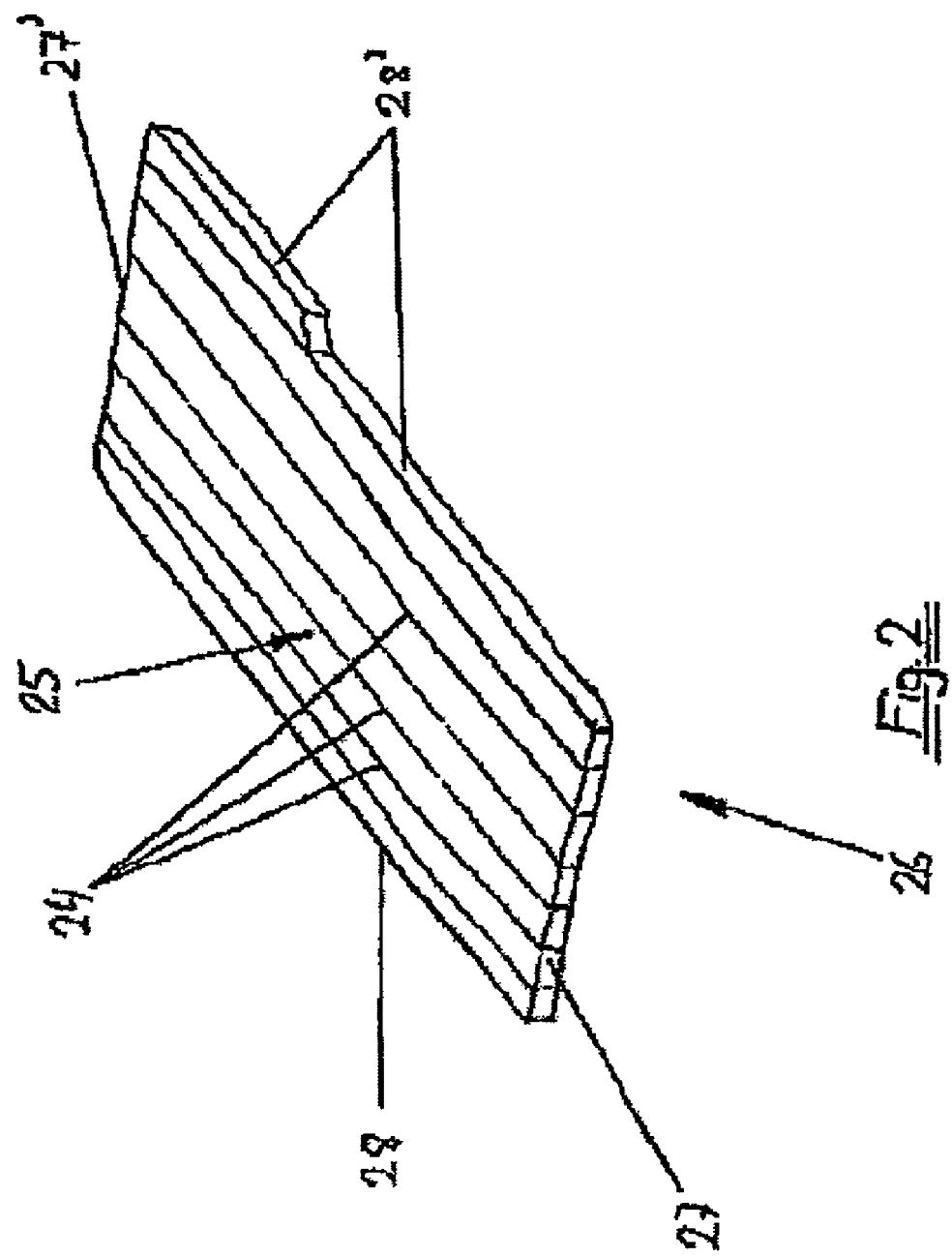
FIG. 2 shows a perspective view of a flake for producing a wood particle mixture according to the invention at an enlarged scale.

FIG. 2 shows a flake for producing a wood particle mixture according to the invention. The flake has two cut surfaces 25, 26, which define its thickness and which run in the direction of its grain 24. The width of the flake in the direction of its grain 24 is defined by cut edges 27, 27'. The length of the flake perpendicular to the direction of its grain 24 is defined by fracture edges 28, 28'.

Figure 3:
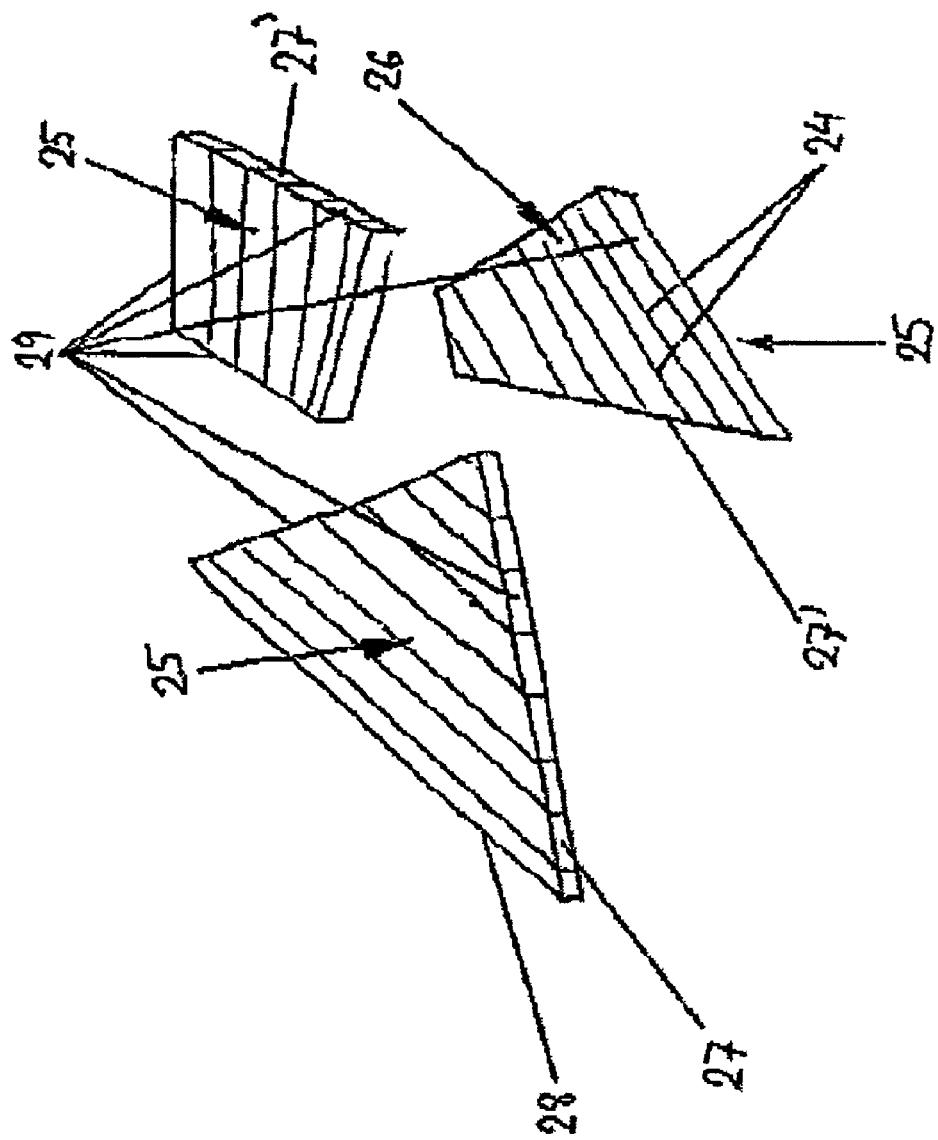
FIG. 3 shows a perspective view of reduced size flakes from the flake shown in FIG. 2.

FIG. 3 shows reduced size flakes from the flake shown in FIG. 2. The reduced size flakes have cut edges 29, which run in undefined directions relative to the grain 24. Equivalent surfaces and edges are provided with the same reference numbers.

Figure 4:
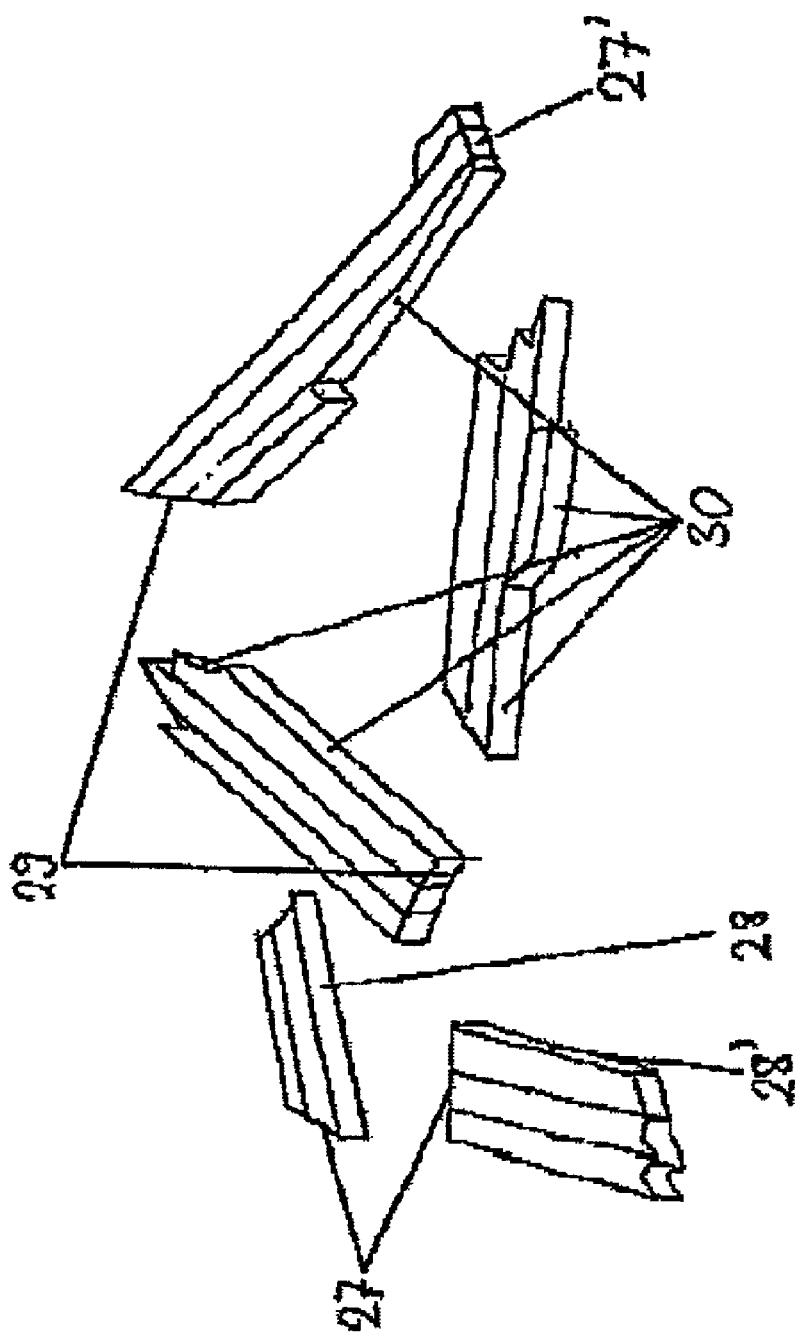
FIG. 4 shows a perspective view of flat splinters from the cut-up flakes shown in FIG. 3.

FIG. 4 shows flat splinters from the cut-up flakes shown in FIG. 3. The flat splinters have fracture edges 30, which run approximately in the direction of the grain 24. Equivalent surfaces and edges are provided with the same reference numbers.

Further variations and modifications of the foregoing will be apparent to those skilled in the art and are intended to be encompassed by the claims appended hereto.

German prior application 103 27 848.6 of Jun. 18, 2003, is relied on and incorporated herein by reference.

I claim:

1. A wood particle mixture, for an extruded or injection-molded wood-plastic composite material, comprising a plurality of wood particles characterized in that the wood particle mixture consists of cut and fractured flakes, each wood particle has two cut surfaces, which define its thickness and which run approximately in the direction of its grain, and each wood particle has cut edges and/or fracture edges defining its length in the direction of the grain and also its width perpendicular to the direction of the grain.

2. The wood particle mixture according to claim 1, which is formed of raw wood.

3. The wood particle mixture according to claim 1, characterized in that at least 90 wt % of the wood particles have a thickness between 0.2 mm and 2.0 mm and also a length and a width up to 8.0 mm.

4. The wood particle mixture according to claim 1, characterized in that at least 90 wt % of the wood particles have a thickness between 0.2 mm and 1.4 mm and also a length and a width up to 2.5 mm.

5. The wood particle mixture according to claim 1, characterized in that the cut surfaces running in the direction of the grain are arranged approximately parallel to each other.

6. The wood particle mixture according to claim 1, characterized in that each wood particle consists of spruce wood.

7. The wood particle mixture according to claim 1, characterized in that each wood particle consists of loblolly pine wood.

8. The wood particle mixture according to claim 1, with a moisture content of less than 15% relative to absolute dry mass.

9. The wood particle mixture according to claim 1, with an extract content of less than 5.5% relative to absolute dry mass.

10. A composition comprising a plastic mixed with the wood particle mixture of claim 1.

11. An article of manufacture extruded or injection molded from the composition of claim 10.

12. Method for producing a wood particle mixture according to claim 1 for an extruded or injection-molded wood-plastic composite material comprising generating flakes of wood from the raw wood by at least one blade, cutting the flakes into smaller pieces, leading the cut-up flakes into a dryer, breaking the cut-up and dried flakes into flat splinters, and filtering the flat splinters according to size.

13. The method according to claim 12, wherein the flakes are generated by means of blades placed parallel to the grain of the raw wood.

14. The method according to claim 12, further comprising leading the flakes into a wet bunker feeding the flakes from the wet bunker by a vibrating flat channel to at least one cutting mill with filter passage, suctioning off the cut-up flakes from the cutting mill by air, leading flakes into a wet cyclone and separating the flakes from the air stream, leading the cut-up flakes from the wet cyclone by a dosing bunker into a dryer, through which dryer the flakes are suctioned by air, leading the cut-up and dried flakes from the dryer into a drying bunker, from bunker the flakes are supplied to a hammer mill with at least one filter passage, in which they are broken up into flat splinters, suctioning the flat splinters from the hammer mill, leading the splinters into a drying cyclone, and separating the splinters from the air stream, and leading the flat splinters from the drying cyclone into a filtering device, in which flat splinters lying in a predetermined range of sizes for the wood particle mixture are filtered out and flat splinters lying above the predetermined range of sizes are fed back into the drying bunker.

15. The method according to claim 14, characterized in that the flat splinters, which were filtered by the filtering device and which lie in predetermined range of sizes, are fed to a wobble sieve and there flat splinters lying below the predetermined range of sizes for the wood particle mixture are separated.

16. The method according to claim 12, characterized in that the flakes are cut up in undefined directions.

17. The method according to claim 12, characterized in that extracts are washed out from the raw wood and/or the flakes and/or the cut-up flakes and/or the flat splinters and/or the wood particle mixture.

18. The device for performing the method according to claim 12, characterized in that
the apparatus has a cutter ring chipper for producing the flakes,
at least one cutting mill is connected to the cutter ring chipper,
a dryer is connected to the cutting mill,
at least one hammer mill is connected to the dryer,
a filtering device is connected to the hammer mill, and
that the filtering device has at least two flat sieves arranged one after the other with different mesh widths.

19. The device according to claim 18, characterized in that a first flat sieve has an open mesh width between 2 mm and 4 mm.

20. The device according to claim 18, characterized in that a second flat sieve has an open mesh width between 0.5 mm and 1.0 mm.

21. A device for performing the method according to claim 12, characterized in that the blade has a length between 15 mm and 25 mm.

22. A device for performing the method according to claim 12, characterized in that the blade is set such that the ratio of the cutting speed divided by the advancing speed is between 550 and 750.

23. A wood particle mixture obtained by the method according to claim 12.

24. A wood particle mixture obtained by the method according to claim 14.

25. The method according to claim 12, further comprising recovering the flat splinters of a desired size.

26. A composition comprising a plastic mixed with the wood particles mixture produced by the method of claim 12.

27. A composition comprising a plastic mixed with the wood particle mixture produced by the method of claim 14.

28. The wood particle mixture of claim 1 wherein the cut and fractured flakes define flat splinters with each of said splinters having fractured edges extending approximately in the direction of the grain and which fractured edges define opposite side edges in each splinter, and said splinters further include splinters having a first cut end edge extending between the opposite side edges and a second fractured end edge positioned opposite the first cut end edge.

29. The wood particle mixture of claim 28 wherein said first cut end edges in said splinters include both cut edging extending perpendicular to the direction of the grain and cut edging extending oblique relative to the direction of the grain.

30. The wood particle mixture of claim 28 wherein said splinters include splinters having the distance between the opposite side edges varying along the length of the splinter.

* * * * *